United States Patent
Iura

[15] 3,683,765
[45] Aug. 15, 1972

[54] APPARATUS TO DETERMINE AN AMOUNT OF EXPOSURE

[72] Inventor: Yukio Iura, Kawasaki-shi, Japan
[73] Assignee: Canon Inc., Tokyo, Japan
[22] Filed: Jan. 22, 1970
[21] Appl. No.: 4,907

[30] Foreign Application Priority Data
Jan. 29, 1969  Japan..................44/7169

[52] U.S. Cl. ..................95/10 C, 95/42, 95/64 B
[51] Int. Cl. .....................G03b 7/12, G03b 17/14
[58] Field of Search..............95/10 C, 64 R, 64 A, 42

[56] References Cited
UNITED STATES PATENTS
3,082,672   3/1963   Swarofsky..................95/10 C
3,503,313   3/1970   Kuramoto..................95/10 C

*Primary Examiner*—Joseph F. Peters, Jr.
*Attorney*—McGlew and Toren

[57] ABSTRACT

A single lens reflex camera having interchangeable lenses and an apparatus for determining the amount of exposure by measuring the light passing through the fully opened aperture of the lens, in which a diaphragm aperture is preset by setting a preset diaphragm aperture setting ring, having a graduated aperture scale of equal spacing, and the starting point of the movement stroke of the ring is set at a fixed position irrespective of the extent of the maximum aperture of an interchangeable lens, and thus the scale for the maximum aperture of the lens comes to the fixed position, which is characterized by an integral coupling member provided on the above-mentioned preset aperture setting ring or to a preset cam engaged with the ring, and at the same time a correction projection, having such a different length as to correct the apparatus referring to the maximum aperture of the interchangeable lens, is provided at the lens so that when the lens is mounted on a camera, the projection makes such correction as compensating for a drop in value in the light measurement with a full-open aperture by a large aperture lens.

7 Claims, 7 Drawing Figures

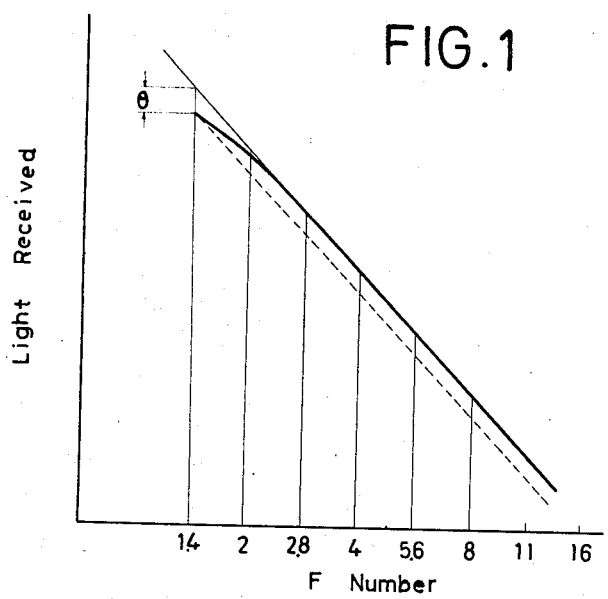
FIG. 1
FIG. 2
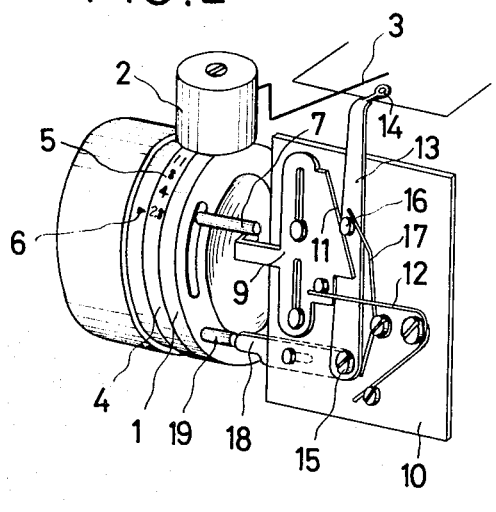
FIG. 3
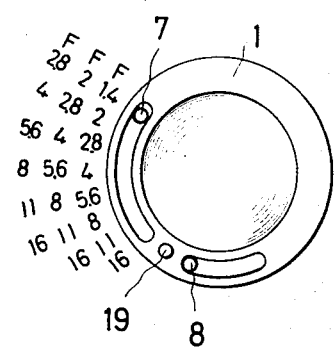
FIG. 4
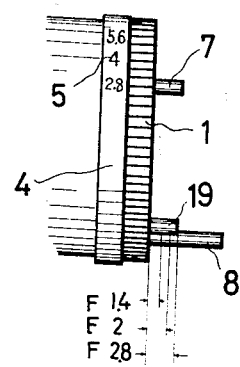
INVENTOR
BY YUKIO IURA
ATTORNEYS

APPARATUS TO DETERMINE AN AMOUNT OF EXPOSURE

In conventional types of cameras wherein light measurement is done with a full-open aperture of a taking lens, such correcting measures have been employed as rotating an exposure meter itself to correct the indicated value, or providing a graduated scale of unequal spacing as a diaphragm aperture scale for compensating for the error in light measurement in the case where a large diaphragm aperture lens is used. Such conventional types of cameras have the defect of a complicated structure and troublesome operation.

The present invention has overcome the above defects of the conventional types of cameras, and provides an apparatus for determining of the exposure of a full-open aperture light measuring type, in which a diaphragm aperture setting ring, having a graduated aperture scale of equal spacing, and the starting point of the movement stroke of the ring is set at a fixed position irrespective of the extent of the maximum aperture of an interchangeable lens, and thus the scale for the maximum aperture of the lens comes into the fixed position, which is characterized in that an integral coupling member is provided on the above-mentioned preset aperture setting ring or to a preset cam engaged with the ring, and at the same time a correction projection, having such a different length as to correct the apparatus referring to the maximum aperture of the interchangeable lens, is provided at the lens so that when the lens is mounted on a camera, the projection makes such correction as compensating for a drop in value in the light measurement with a full-open aperture is a large aperture lens, and means including a frame and cam means are further provided to engage the coupling member for receiving the diaphragm aperture value of the preset ring and for transmitting it to a lever mounted on the frame and in contact with the cam means. In accordance with the structure of this invention, an interchangeable lens is attached to a camera, and the coupling member on the preset ring transmits the diaphragm aperture value information by displacing the lever in accordance with the preset diaphragm value and the correction projection makes such correction as compensating for a drop in the value of the light measurement with a full-open aperture by a large aperture lens.

Further the present invention relates to an interchangeable single lens reflex camera provided with a TTL exposure meter, that is an exposure meter of the type that measures the light passing through the taking lens, and is particularly related to a correction apparatus for light measurement in a camera wherein as the light is being measured with a full-open aperture the, optimum exposure is indicated by a measuring indicator of the meter and at the same time the diaphragm aperture for optimum exposure is preset by adjusting a preset aperture setting ring and thereby a reference indicator for the measuring indicator, which makes a linked movement with the ring, is overlapped with the measuring indicator, and further a preset aperture setting ring has a graduated scale of equal spacing, wherein the starting point of the movement stroke is set at a fixed position, regardless of the extent of maximum aperture of interchangeable lenses so that the scale for the maximum aperture comes to the fixed position.

Thus it is especially intended in the present invention to correct the error in light measurement which takes place ordinarily when a large aperture lens is used as the interchangeable lens.

Generally speaking, the amount of light received by a photosensitive element of a TTL exposure measuring apparatus is in proportion to the aperture area of the lens, but in a large aperture lens the peripheral light is reduced because of the rule of cosine fourth power and vignetting by frames, etc., and the above-mentioned proportionate relationship will not be maintained in the case of light measurement with a full-open geometric aperture. FIG. 1 shows such relationship, as mentioned above, by the geometric F number of lens and the intensity of illumination on the surface of a photosensitive element, wherein the proportionate relationship is maintained down to F: 2.8, but an error or deviation in light measurement will develop as the, F values become lower than 2.8. Therefore, when light is measured with a full-open aperture of F: 1.4 in such a camera as mentioned above, there is naturally an exposure error when photographing with a full-open aperture, and further even when photographing is done with a smaller aperture, less than F: 1.4, by rotating the preset aperture setting ring and thereby bringing the reference indicator which makes a linked movement with the ring overlapping the measuring indicator, exposure will be made in a manner as shown by the broken line in FIG. 1, and there will be an error.

The present invention provides means for correcting the error in measuring light when a large aperture lens is used, wherein the reference indicator, which makes a linked movement with a preset aperture setting ring, is made so as to be shiftable, and a correction projection is provided at the interchangeable lens which has a different length corresponding to the error, so that the projection pushes the reference indicator when such a lens is mounted onto a camera, shifting the position of the reference indicator, thus the drop in the value of the light measured in a large aperture lens with a full-open aperture is corrected by the correction projection.

Now, explanation shall be made in reference to attached drawings in which:

FIG. 1 is a diagram showing the relationship between the F number of a lens in a TTL exposure measuring apparatus and the amount of light received by the measuring apparatus.

FIG. 2 is a perspective view showing a structure of related parts for a camera provided with the apparatus of the present invention.

FIG. 3 is a rear view of the lens in the camera.

FIG. 4 is a side view of the lens.

Figure 5:
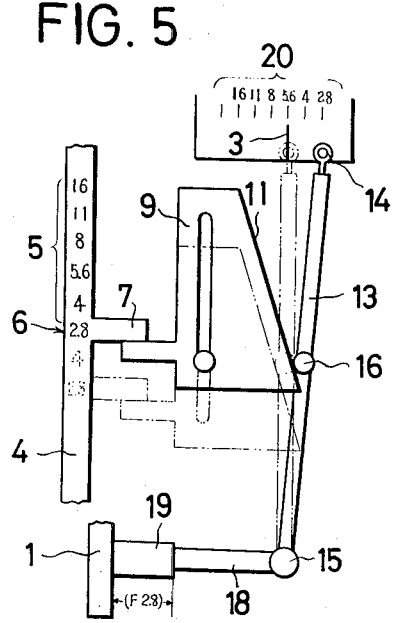
FIG. 5 is a side view showing the relationship of the related parts of the camera to which a lens of F: 2.8 is attached.

In FIGS. 2 to 6, a portion of a camera is shown including a rear portion of a taking lens 1, a meter 2 actuated by a photo-sensitive element (not shown in the drawing) which receives the light passing through the taking lens is positioned on the lens and has an indicator 3, diaphragm aperture setting ring 4 is rotatably provided on the setting ring 4 with an indication mark 6 for the scale 5, a linked movement transmission pin 7 projects directly from the preset aperture setting ring 4 or projects from a preset cam member engaged on the ring for transmitting the movement of the ring 4 to the camera, and the linked movement pin 7 acts as coupling member between the preset ring 4 and means including a frame and movable members positioned on the frame and hereinafter described, and the pin has, as shown in FIG. 3, the starting point of its stroke at the same fixed position for each of the interchangeable lenses regardless of the extent of their maximum aperture, and the position of the widest diaphragm aperture is at the above-mentioned fixed position. In FIG. 3, a linked movement pin 8 brings the diaphragm aperture to the preset value. The mechanism on the camera for actuating the pin is omitted from the drawing.

A cam plate 9 which is slidably provided on a frame 10 in such a manner that the cam plate engages the pin 7 of the preset diaphragm aperture setting ring 4 at its one end and makes a linked movement therewith, the cam plate 9 acts as a transmission member for transmitting the diaphragm aperture value in accordance with the movement of the pin 7 associated with the preset ring 4. The cam plate 9 has a cam surface 11 and, a spring 12 is arranged to afford a return to the cam plate 9, 13 is a reference lever 13 has at one end a reference needle 14 which is brought to alignment with the indicator 3 of the meter 2, a fulcrum 15 is provided for the lever 13, a pin 16 is provided on the reference lever 13 arranged to contact the cam surface 11, and a spring 17 affords to give a return characteristic to the reference needle 14, wherein by rotating the preset diaphragm aperture setting ring 4, the reference lever 13 is made to rotate following the cam plate 9 so that the reference needle 14 is brought to alignment with the meter indicator 3. In the present invention, the fulcrum 15 is provided on a sliding piece 18 which is slidably provided on the frame member 10 and is thus made to be shiftable, further a correction projection 19, which has a different length corresponding to the above-mentioned light measuring error, is provided at the rear portion 1 of the lens, so that when the lens is mounted on the camera, the sliding piece 18 is pushed by the projection 19, thus shifting the position of the fulcrum 15 of the reference lever 13 to a compensated position, effecting necessary correction, so that the lever 13 acts as a signalling member for receiving the diaphragm aperture value information and the correction signal through the correction projection 19.

When a camera having the above-mentioned apparatus is used for taking a picture, first the lens is directed toward the object with a full-open aperture, the meter indicator 3 swings depending on the amount of light. The position of the indicator then shows how many graduations the diaphragm aperture should be reduced from a full-open position in order to give the camera an optimum exposure for the lens used. Next the preset diaphragm aperture setting ring 4 is rotated for bringing the reference needle 14 to overlap with the meter indicator 3. Thus the preset diaphragm aperture setting ring 4 is supposed to be set at the optimum exposure position, and further explanations shall be made in the case of the lens having the maximum aperture of F: 2.8 and the case of the lens of F: 1.4, referring respectively to FIG. 5 and FIG. 6.

Figure 6:
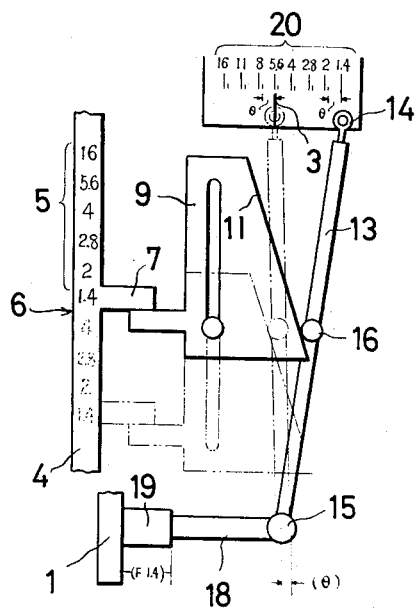
FIG. 6 is side view similar to FIG. 5 with a F: 1.4 lens mounted on the camera.

FIG. 5 shows the case when a lens of F: 2.8 is mounted, while FIG. 6 shows the case when a lens of F: 1.4 is attached, wherein the length of the correction projection 19 in each case is different corresponding to the amount of light measuring error, thereby the position of the fulcrum 15 of the reference lever 13 for the lens of F: 1.4 is shifted from the position of the fulcrum 15 for the lens of F: 2.8 by an amount corresponding to the $\theta$ in FIG. 1. Now, if the F: 5.6 is the value to provide optimum exposure for on object, the meter indicator 3 when measurement of light is made with a full-open aperture in the case of a lens of F: 2.8 is at the position shown in FIG. 5. (20 is a supposed scale of the diaphragm aperture for the convenience of description). In this case it shows that if the diaphragm aperture is reduced by two graduations from the full-open aperture of F: 2.8, an optimum exposure may be secured, and since there is no such a drop in the indicated value as $\theta$ in FIG. 1, the indicator 3 makes a correct indication, thus with the reference needle 14 the preset diaphragm aperture setting ring 4 may be set to secure an optimum exposure. The fulcrum 15 of the reference lever 13 is placed at such an appropriate position as to obtain the indicated value.

Next, in the case of the lens of F: 1.4, the meter indicator 3 is at the position shown in FIG. 6, wherein while the indicator 3 should have been deflected by 4 graduations from the full-open aperture as F: 5.6 is the optimum exposure, there is an error in the position of the indicator at the full-open aperture from its appropriate position by such an extent as corresponding to the value $\theta$ in FIG. 1, because of the drop in the indicated value by that extent. Therefore, if the reference needle is made to overlap with the indicator by a simple mechanism, the above-mentioned error will be reflected to the preset diaphragm aperture. The shifting of the position of the fulcrum 15 of the reference lever 13 is necessary to effect correction of the lever, and by shifting the position of the fulcrum 15 as shown in FIG. 6 with the correction projection 19, the preset diaphragm aperture setting ring 4 is set to an aperture value of the optimum exposure by overlapping the reference needle 14 with the meter indicator 3.

In conventional types of camera wherein light measurement is done with a full-open aperture, such correcting measures have been employed as rotating an exposure meter to correct the indicated value, or providing a graduated scale of unequal spacing as a diaphragm aperture scale for compensating for the error in light measurement in the case where a large diaphragm aperture lens is used. Such a conventional structure has the disadvantage of being complicated or troublesome in operation.

Contrary to the above conventional structure, in the present invention the fulcrum of the reference needle is made to be shiftable and when a lens is mounted the position of the reference needle is adjusted by the correction projection provided at the lens, thus effecting correction of the value indicated by the indicator, thus its structure is so simple and the correction operation can be easily done.

Figure 7:
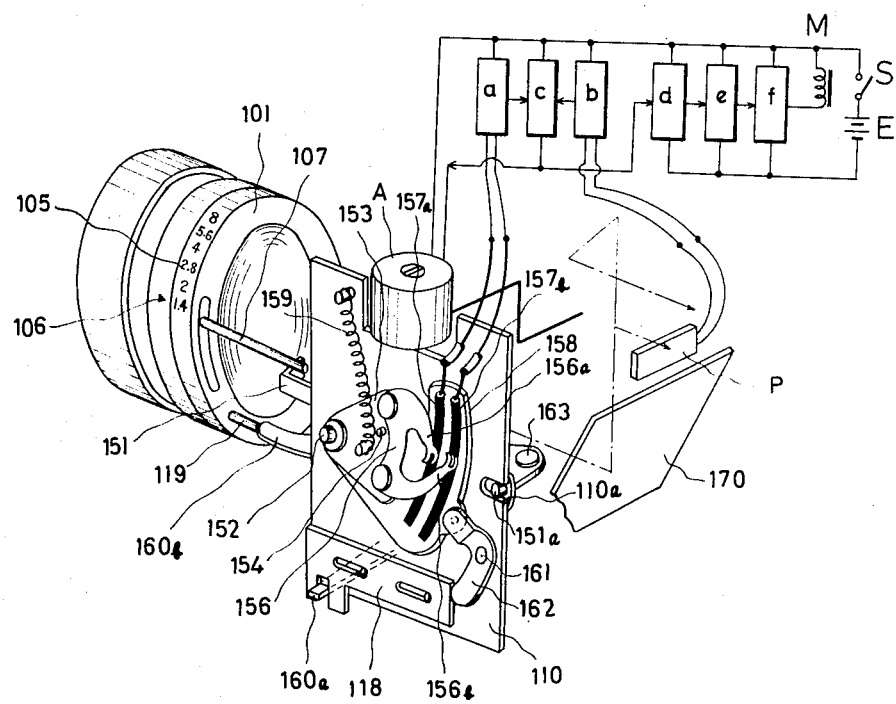
FIG. 7 is a perspective view showing another embodiment of the present invention.

Another embodiment of the present invention shall be described referring to FIG. 7.

In a single lens reflex camera using an electronic shutter, the diaphragm aperture value is preset and after measuring the light intensity of an object the shutter speed is selected, wherein the error in light measurement, as mentioned before in light measurement with a full-open aperture in a large aperture lens, results in erroneous selection of the shutter speed.

Therefore the correction corresponding to the full-open F number is made to the shutter speed setting member. An oscillating plate 158 axially attached to a frame member 110 by an axle 152 has electric resistors 157($a$)($b$) made of carbon, etc. and on another oscillating plate 153 which is axially supported on the axle, two electrically insulated contact arms 156($a$), 156($b$) and contacting piece 156 are mounted so as to be able to slide on the resistors 157($a$) and 157($b$) and are always biased in an anticlockwise direction by a spring 159. On the oscillating plate 153, a pin 154 projects inwardly through the frame member 110, and the tip of the pin 154 engages a lever 151. A pin 151($a$) provided at one end of the lever 151 engages in a slit 110($a$) in the frame member 110 and the other lever 151 is rotatably supported by the pins 154 and 151($a$) and the tip of the lever 151 engages the pin 107 of the lens.

One end of a lever 162, which is axially attached to the frame member 110 by an axle 161, is engaged with the oscillating plate 158 through a pin-slot engagement while the other end of the lever 162 engages with a sliding plate 118 which is slidably provided on the frame member 110. One end 160($a$) of a forked lever 160 engages with the forked part of the sliding plate 118 and is pivoted to the bottom portion of the frame member by an axle 163, which the other and 160($b$) of the lever 160 engages a correction projection 119 of the lens.

When a lens is mounted on the camera, the forked lever 160 is pushed by the correction projection 119 and is rotated in an anticlockwise direction around the axle 163, and the sliding plate 118, which engages with one end of the lever 162, slides to the right. Thereby the lever 162 rotates in an anticlockwise direction around the axle 161, causing the oscillating plate 158 to rotate in a clockwise direction around the axle 152. Therefore the position of the oscillating plate 158 is determined corresponding to the length of the correction projection of the lens.

When the camera is directed toward an object and an aperture is appropriately preset by rotating a diaphragm aperture setting ring 104, the pin 107 moves and pushes the lever 151 rotating the same around the pin 151($a$), and the oscillating plate 153 which engages with the lever 151 by the pin 154 also makes a clockwise rotation around the axle 152, and thus a resistance value for the preset aperture value with a correction corresponding to the length of the correction projection of the lens will be established between the contacting arms 156($a$) and ($b$). The light passing through the lens is reflected at a mirror 170 and is directed to a finder system, and a portion of the light is directed by another reflective mirror, not shown in the drawing, to a photo-conductive light measuring element P.

A is an ampere meter, E is a power source battery for the electronic shutter, S is its main switch, a is an information input circuit for an aperture value, wherein the aperture value is corrected at full-open aperture by the resistance value of the resistors 157($a$)($b$) and then put into the information input circuit $a$. On the other hand $b$ is TTL light measuring circuit actuated at full-open aperture, and its output of the above-mentioned circuit $a$, depending on the change in the value of the photo-conductive element P for light measurement. The output of the comparison circuit $c$ is directed to a memory circuit $d$, and stores in the memory the light measurement value before the mirror 170 jumps up by for instance a capacitor or condensor, when the mirror 170 jumps up and the input light to the photo-conductive element P is cut out. A regenerating circuit e is shown which serves to regenerate, for example, the current value of the memory value as the light measurement value which is stored in the memory circuit $d$. A switching circuit $f$ is shown as a shutter control circuit which is controlled by the regenerating circuit $e$, and has a switching means which corresponds to the start of the first curtain of the focal plane shutter. The switching circuit $f$ is activated to count by the switching means and after an elapse of predetermined length of time an electromagnet M for driving the second curtain of the shutter is activated.

In summarizing, according to the second embodiment, by simply shifting the variable resistors themselves for effecting correction and at the same time shifting the contacting member which is linked with the above-mentioned P in 107 in relation to the variable resistors, corresponding to the preset value of an interchangeable lens, a correction which corresponds to the light measuring error of the interchangeable lenses is also performed by very simplified means simultaneously when geometric diaphragm aperture information is fed into the driving circuit for the electronic shutter of the exposure determining apparatus. Thus, the apparatus is very effective when applied to a single lens reflex camera having an electronic shutter using such interchangeable lenses of full-open aperture light measuring type.

The meter A is appropriately provided to the light path of a finder with its indicator that the shutter speed in this case is always recognized through the finder, thus it is effective to eliminate such a possibility as setting an inadequate value for the exposure.

What is claimed is:

1. An apparatus for determining the amount of exposure for a single lens reflex camera comprising an interchangeable lens having a variable diaphragm, a preset diaphragm aperture setting ring rotatably assembled on said lens, a pin provided on said preset ring, an exposure meter having an indicating means and a light receiving element which receives light passing through the lens with a full-open aperture, a means in engagement with said pin for transmitting the diaphragm aperture value from said preset ring, said means including a frame and cam means movably displaceable on said frame, a lever for the diaphragm aperture value rotatably connected to said frame, said means arranged to engage said pin at a fixed position irrespective of the extent of the maximum aperture of the lens when the lens with a full-open aperture is mounted on the camera for transmitting the movement stroke of said preset ring to said lever for the diaphragm aperture value, and a correction projection positioned on said interchangeable lens for providing a correction which compensates for the drop in light receiving value caused by vignetting and the like in said lens, said correction projection arranged to displace said lever for the diaphragm aperture value when said lens is mounted on the camera and to shift said lever by the amount corresponding to the correction for correcting the diaphragm aperture value.

2. An apparatus, as set forth in claim 1, wherein said cam means comprises a plate having a cam surface, said plate is slidably supported on said frame, a sliding piece slidably mounted on said frame is arranged in engagement with said correction projection for slidable displacement by said correction projection based on the correction for said interchangeable lens, said lever is pivotally attached to said sliding piece, and a spring biases said lever against the cam surface on said plate so that said lever is pivotally displaced as said plate slides on said frame.

3. An apparatus, as set forth in claim 1, wherein said cam means comprises a slidably mounted cam member, said indicating means on said exposure meter comprises an indicator arranged to swing into position depending on the amount of light received by said light receiving element after the light passes through the lens with the full-open aperture, a sliding piece slidably mounted on said frame is arranged in engagement with said correction projection for slidable displacement by said correction projection based on the correction for said interchangeable lens, said lever is pivotally attached to said sliding piece, said cam member for the diaphragm aperture value is arranged in engagement with said pin for displacement due to the movement stroke of said preset ring, spring means for biasing said lever into contact with said cam member so that said lever can be pivoted about its attachment to said sliding piece by said cam member for indicating that the diaphragm is preset at an optimum value when said lever is overlapped by said indicator of said exposure meter.

4. An interchangeable lens arrangement for a single lens reflex camera comprising an interchangeable lens having a variable diaphragm, a preset ring rotatably assembled on said lens, a pin provided on said preset ring, a shutter speed setting device including a photoconductive element which receives light passing through the lens with a full-open aperture, means in engagement with said pin for transmitting the diaphragm aperture value from said preset ring, said means including a frame and a first plate movably displaceable on said frame, a second plate for the diaphragm aperture value rotatably connected to said frame, said means being arranged in engagement with said pin at a fixed position irrespective of the extent of the maximum aperture of said lens when said lens is mounted on a camera with a full-open aperture for transmitting the movement stroke of said preset ring to said plate for the diaphragm aperture value, a correction projection positioned on said interchangeable lens and providing a correction which compensates for the decrease in light receiving value caused by vignetting and the like in the lens, said correction projection arranged to engage said second plate for the diaphragm aperture value when said lens is mounted on the camera for compensating the signal of the diaphragm aperture value corresponding to the correction of said correction projection.

5. An interchangeable lens arrangement, as set forth in claim 4, wherein said shutter speed setting device comprises an input circuit for the diaphragm aperture information coupled to said second plate for the diaphragm aperture value, a light measuring circuit connected to said photoconductive element, another input circuit composed of a comparison circuit for the output of said diaphragm aperture information input circuit and the output of said light measuring circuit, and a shutter speed setting circuit containing a switching circuit.

6. An interchangeable lens arrangement, as set forth in claim 5, wherein a resistor is mounted on said second plate, a contact arm is positioned on said first plate for the diaphragm aperture value in sliding engagement with said resistor, and said resistor being connected to said input circuit for the diaphragm aperture information.

7. An interchangeable lens arrangement, as set forth in claim 6, wherein said first plate by means of said pin moves together with the movement stroke of said preset ring, said contact arm mounted on said first plate slides above said resistor on said second plate for transmitting the information of the diaphragm aperture value to said second plate, said second plate being moved through said first plate by said correction projection of said interchangeable lens and said resistor mounted on said second plate transmits to said diaphragm aperture information input circuit the information of the diaphragm aperture correction corresponding to the correction of said correction projection; said photoconductive element which receives the light passing through the interchangeable lens with a full-open aperture inputs the information of the aperture value to said light measuring circuit, and said comparison circuit inputs the information of both of the diaphragm aperture and the aperture value to said shutter speed setting circuit for setting an optimum exposure value.

* * * * *